(12) United States Patent
Kim et al.

(10) Patent No.: US 6,944,367 B2
(45) Date of Patent: Sep. 13, 2005

(54) OPTICAL SOURCE GENERATOR FOR WAVELENGTH DIVISION MULTIPLEXING OPTICAL COMMUNICATION SYSTEMS

(75) Inventors: Jong-Kwon Kim, Taejonkwangyok-shi (KR); Yun-Je Oh, Yongin-shi (KR); Seong-Taek Hwang, Pyongtaek-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 10/650,414

(22) Filed: Aug. 28, 2003

(65) Prior Publication Data

US 2004/0052451 A1 Mar. 18, 2004

(30) Foreign Application Priority Data

Sep. 18, 2002 (KR) .............................. 10-2002-0056997

(51) Int. Cl.⁷ ............................................... G02B 6/28
(52) U.S. Cl. .......................... 385/24; 385/46; 398/79
(58) Field of Search ............................. 385/24–27, 37, 385/46–48, 122; 398/72, 79

(56) References Cited

U.S. PATENT DOCUMENTS 6,137,604 A * 10/2000 Bergano .................... 385/24 X

* cited by examiner

*Primary Examiner*—Phan T. H. Palmer
(74) *Attorney, Agent, or Firm*—Cha & Reiter, LLC

(57) ABSTRACT

There is disclosed an optical source generator for wavelength division multiplexing optical communication systems. The optical source generator includes first and second pumping light generators; a first wavelength router for wavelength-division-demultiplexing first pumping lights inputted into a multiplexing port of its first port section to output the demultiplexed pumping lights to the demultiplexing ports of its second port section, and for wavelength-division-demultiplexing second pumping lights inputted into the multiplexing port of its second port section to output the demultiplexed pumping lights to the demultiplexing ports of its first port section; a plurality of first and second optical fiber amplifiers; a second wavelength router for wavelength-division-multiplexing optical signals inputted from the first optical fiber amplifiers into the demultiplexing ports of its first port section, and outputting the multiplexed optical signals to the multiplexing port of its second port section, and for wavelength-division-multiplexing optical signals inputted from the second optical fiber amplifiers into the demultiplexing ports of its second port section, and outputting the multiplexed optical signals to the multiplexing port of its first port section; and first and second optical band pass filters, wherein two groups of optical sources are generated bilaterally.

17 Claims, 7 Drawing Sheets

OPTICAL SOURCE GENERATOR FOR WAVELENGTH DIVISION MULTIPLEXING OPTICAL COMMUNICATION SYSTEMS

CLAIM OF PRIORITY

This application claims priority to an application entitled "Optical Source Generator For Wavelength Division Multiplexing Optical Communication Systems," filed in the Korean Intellectual Property Office on Sep. 18, 2002 and assigned Serial No. 2002-56997, the contents of which are hereby incorporated by reference.

BACKGROUND OF THE INVENTION

1. Field of the Invention

The present invention relates to an optical source generator for wavelength division multiplexing optical communication systems.

2. Description of the Related Art

Recently, research has been actively carried out regarding wavelength division multiplexing (WDM) using a multi-channel optical source in order to increase transmission capacity in the optical communication field. Here, the multi-channel optical source in the WDM system makes use of an approach which allocates an optical signal to be transmitted to an assigned wavelength. Currently, a semiconductor laser is generally used as the optical source of the transmitter in the WDM optical communication system. However, this semiconductor laser optical source needs a precise wavelength control, because the laser should be precisely controlled to operate at a wavelength recommended by the International Telecommunication Union (ITU), and because an output wavelength is controlled by means of a temperature control. If a multi-channel optical source is needed, the number of wavelengths to be controlled increases, which complicates the control operation. In addition, if a multi-plexed multi-channel optical source is needed, a separate multiplexer is required.

To solve these problems, a multi-wavelength laser optical source generator has been developed that employs two 1×N arrayed wave-guide gratings and an erbium-doped fiber amplifier.

FIG. 1 shows a construction of a conventional multi-wavelength laser optical source generator. As shown in FIG. 1, in the conventional multi-wavelength laser optical source generator, N ports of a wavelength division multiplexer 10 are interconnected with N ports of a wavelength division demultiplexer 20 by a plurality of optical fibers 30, and a plurality of optical fiber amplifiers 40 are disposed on the plurality of optical fibers 30. A multiplexed port of a wavelength division multiplexer 10 is interconnected with a multiplexed port of a wavelength division demultiplexer 20 through a wide band pass filter (OBPF) and an optical fiber.

Spontaneous emissions generated from the optical fiber amplifiers 40 by pumping operation of a plurality of pump lasers 60, which are connected to the demultiplexed ports of the wavelength division demultiplexer 20, are lased as the lights are infinitely circulated along to the wavelength division multiplexer 10, the OBPF 50, the wavelength division demultiplexer 20 and the optical fiber amplifiers 40, in turn. Here, the OBPF 50 is used to select a passband of an arrayed wave-guide grating having a periodical property. Further, between the OBPF 50 and the wavelength division demultiplexer 20 is disposed a coupler 70 which can be used as a multi-wavelength optical source. Between output terminals of the optical fiber amplifiers 40 and demultiplexed ports of the wavelength division multiplexer 10 are disposed a plurality of modulators 80 having N in number, each of which can be used as a single wavelength optical source.

However, if the number of optical sources needs to be increased in the conventional optical source generator, for example if the number of basic optical source channels needs to be increased from N to 2N, another optical source generator is required. That is to say, when using conventional multi-wavelength ring laser optical sources, an additional N optical sources must be provided using optical fiber amplifiers, two 1×N arrayed wave-guide gratings must also be provided, and temperature must be controlled so that the arrayed wave-guide gratings can be operated. Therefore, it is not likely that reduction of an installation expense, improvement of installation efficiency, etc. can be achieved when there is such an increment in the number of the optical channels.

SUMMARY OF THE INVENTION

The present invention provides an optical source generator for wavelength division multiplexing optical communication systems enabling cost-effective expansion of the number of optical channels of optical sources.

The present invention provides an optical source generator for wavelength division multiplexing optical communication systems enabling optical sources which malfunction to be replaced during operation with other optical sources.

The present invention is an optical source generator for wavelength division multiplexing optical communication systems, comprising: a first and second pumping light generator that generates and outputs pumping lights having a specific wavelength; a first wavelength router, having first and second port sections each of which comprises a multiplexing port and a plurality of demultiplexing ports, that wavelength-division-demultiplex the pumping lights inputted from the first pumping light generator into the multiplexing port of the first port section and output the wavelength-division-demultiplexed pumping lights to the demultiplexing ports of the second port section, and that wavelength-division-demultiplex the pumping lights inputted from the second pumping light generator into the multiplexing port of the second port section and output the wavelength-division-demultiplexed pumping lights to the demultiplexing ports of the first port section; a plurality of first optical fiber amplifiers that generate spontaneous emissions from the pumping lights outputted from the demultiplexing ports of the second port section of the first wavelength router, and output the generated spontaneous emissions as optical signals; a plurality of second optical fiber amplifiers that generate spontaneous emissions from the pumping lights outputted from the demultiplexing ports of the first port section of the first wavelength router, and output the generated spontaneous emissions as optical signals; a second wavelength router, having a first and second port section each of which comprises of one multiplexing port and a plurality of demultiplexing ports, that wavelength-division-multiplex optical signals inputted from the first optical fiber amplifiers into the demultiplexing ports of the first port section and output the wavelength-division-multiplexed optical signals to the multiplexing port of the second port section, and that wavelength-division-multiplex optical signals inputted from the second optical fiber amplifiers into the demultiplexing ports of the second port section and output the wavelength-division-multiplexed optical signals to the multiplexing port of the first port section; a first optical band pass filter that passes only optical sources having a particular wavelength band of multi-wavelength optical sources outputted from the multiplexing port of the second port section of the second wavelength router, and inputs the passed optical sources into the multiplexing port of the first port section of the first wavelength router; and a second optical band pass filter that passes only optical sources having a particular wavelength band of multi-wavelength optical sources outputted from the multiplexing port of the first port section of the second wavelength router, and inputs the passed optical sources into the multiplexing port of the second port section of the first wavelength router, wherein first optical sources are generated through first optical paths that direct in an input direction of the pumping lights inputted from the first pumping light generator, second optical sources being generated through second optical paths which direct in an input direction of the pumping lights inputted from the second pumping light generator.

DETAILED DESCRIPTION OF THE PREFERRED EMBODIMENTS

Figure 1:
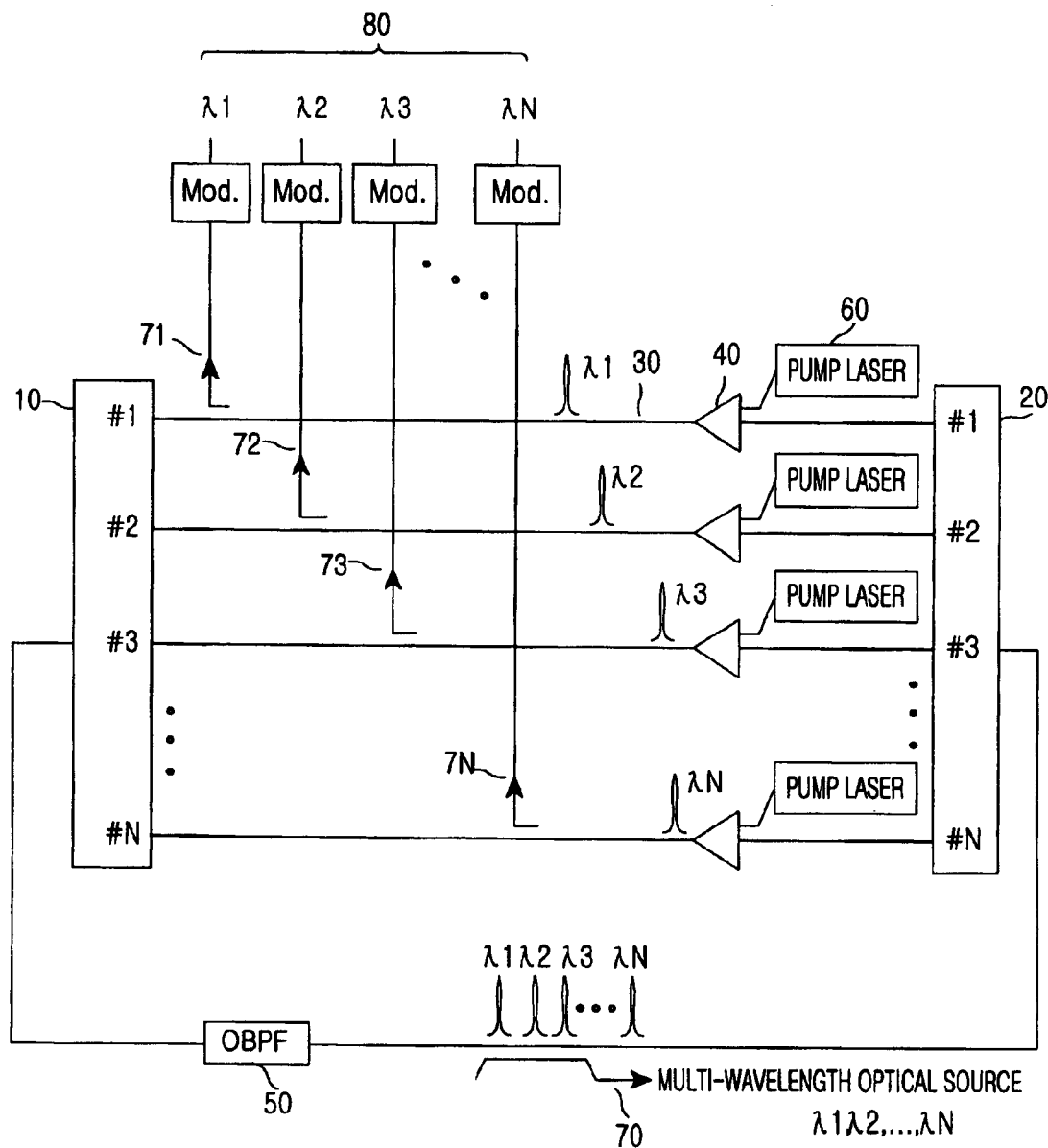
FIG. 1 illustrates a multi-wavelength laser optical source generator according to the prior art.

Hereinafter, preferred embodiments of the present invention is described in detail with reference to the attached drawings, especially FIGS. 2 to 7. It should be noted that similar parts are given reference numerals and symbols as similar as possible throughout the drawings. In the following description of the present invention, a detailed description of known functions and configurations incorporated herein is omitted when it may make the subject matter of the present invention rather unclear.

Figure 2:
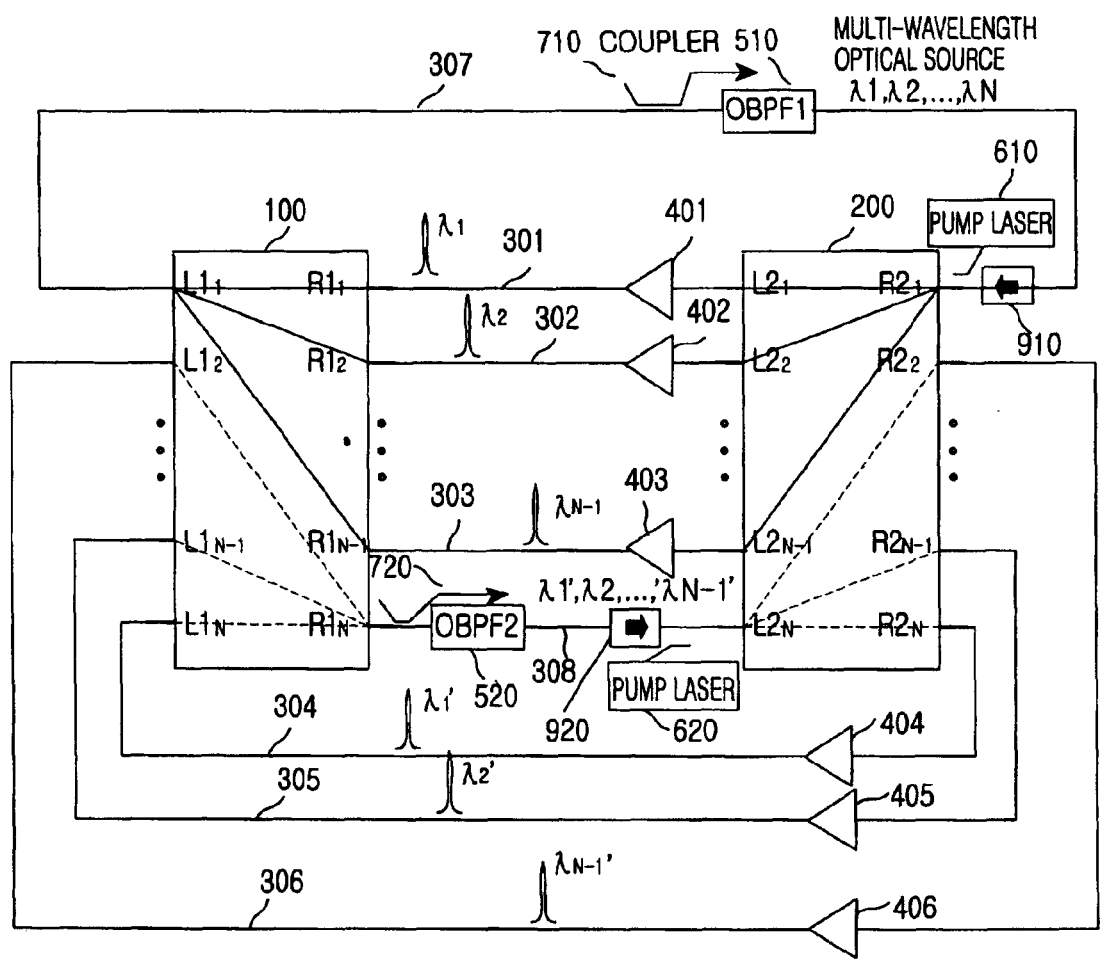
FIG. 2 illustrates an optical source generator of wavelength division multiplexing optical communication systems according to a first embodiment of the present invention.

FIG. 2 shows a construction of an optical source generator of wavelength division multiplexing optical communication systems according to a first embodiment of the present invention. As shown in FIG. 2, an optical source generator of wavelength division multiplexing optical communication systems according to a first embodiment of the present invention comprises a first and second wavelength router 100 and 200, optical fibers 301 to 308, optical fiber amplifiers 401 to 406, optical band pass filters 510 and 520, pump light generators 610 and 620, couplers 710 and 720, and optical isolators 910 and 920.

The first wavelength router 100 is provided with an input terminal and an output terminal, each of which has a plurality of ports, N in number. For convenience' sake, the ports on the right hand on viewing FIG. 2 represent $R1_1$, $R1_2, R1_3, \ldots, R1_N$, respectively, while the ports on the left hand represent $L1_1, L1_2, L1_3, \ldots, L1_N$, respectively. Similarly, the second wavelength router 200 is provided with an input terminal and an output terminal, each of which has a plurality of ports, N in number. For convenience' sake, the ports on the right hand on viewing FIG. 2 represent $R2_1$, $R2_2, R2_3, \ldots, R2_N$, respectively, while the ports on the left hand represent $L2_1, L2_2, L2_3, \ldots, L2_N$, respectively.

The ports $R1_1$ to $R1_{N-1}$ of the first wavelength router 100 function as demultiplexing ports. The ports $L2_1$ to $L2_{N-1}$ of the second wavelength router 200 also function as demultiplexing ports. The demultiplexing ports $R1_1$ to $R1_{N-1}$ of the first wavelength router 100 are connected through the optical fibers 301 to 303 with the demultiplexing ports $L2_1$ to $L2_{N-1}$ of the second wavelength router 200. Each of the optical fibers 301 to 303 is provided with optical fiber amplifiers 401 to 403. Similarly, the ports $L1_2$ to $L1_N$ of the first wavelength router 100 function as demultiplexing ports. The ports $R2_2$ to $R2_N$ of the second wavelength router 200 also function as demultiplexing ports. The demultiplexing ports $L1_2$ to $L1_N$ of the first wavelength router 100 are connected through the optical fibers 304 to 306 with the demultiplexing ports $R2_2$ to $R2_N$ of the second wavelength router 200. Each of the optical fibers 304 to 306 is provided with optical fiber amplifiers 404 to 406.

The first optical band pass filter (OBPF1) 510 is interposed between a multideplexing port $L1_1$ of the first wavelength router 100 and a multideplexing port $R2_1$ of the second wavelength router 200, connecting the multiplexing ports $L1_1$ and $R2_1$ to each other through the optical fiber 307. Similarly, the second optical band pass filter (OBPF2) 520 is interposed between a multideplexing port $R1_N$ of the first wavelength router 100 and a multideplexing port $L2_N$ of the second wavelength router 200, connecting the multiplexing ports $R1_N$ and $L2_N$ to each other through the optical fiber 308.

The first and second pumping light generator 610 and 620 respectively supply pumping light to the multiplexing port $R2_1$ and $L2_N$ of the second wavelength router 200.

The optical fiber amplifiers 401 to 403 and 404 to 406 generate spontaneous emissions from pumping lights which are multiplexed and transmitted by the second wavelength router 200. This optical fiber amplifier is manufactured by doping rare-earth ions such as erbium (Er), praseodymium (Pr), neodymium (Nd) or the like to an active optical fiber. When pumping lights having a particular wavelength are transmitted into this optical fiber, stimulated photons having a particular wavelength are emitted by excitation of the rare-earth ions. As a result, optical signals transmitted through the corresponding optical fiber are amplified.

The first and second optical isolator 910 and 920 are each interposed on one multiplexing link connecting the multiplexing port $L1_1$, of the first wavelength router 100 with the multiplexing port $R2_1$ of the second wavelength router 200 and on the other multiplexing link connecting the multiplexing port $R1_N$ of the first wavelength router 100 with the multiplexing port $L2_N$ of the second wavelength router 200. The first and second optical isolator 910 and 920 are intended to prevent the spontaneous emissions generated by the optical fiber amplifiers from being transmitted to the other ports through arrayed wave-guide gratings to have influence on the other different optical sources. The first and second optical isolator 910 and 920 cause both a group of multi-wavelength lasers $\lambda_1, \lambda_2, \lambda_3, \ldots, \lambda_{N-1}$ and a group of multi-wavelength lasers $\lambda_1', \lambda_2', \lambda_3', \ldots, \lambda_{N-1}'$ to be circulated in a direction different from each other, thereby allowing influences resulting from a cross-talk which may take place through arrayed wave-guide gratings to be restrained, as well as allowing each group of multi-wavelength lasers to be independently operated.

The optical source generator of the present invention, constructed as disclosed above, is operated as follows.

Pumping lights generated from the first pumping light generator 610 are inputted into the multiplexing port $R2_1$ of the second wavelength router 200, spectrum-split into N−1 in number and wavelength-division-demultiplexed, and then outputted to the demultiplexing ports $L2_1$ to $L2_{N-1}$ of the second wavelength router 200. The wavelength-division-demultiplexed pumping lights are inputted through optical fibers 301 to 303 into the optical fiber amplifiers 401 to 403, and thus the optical fiber amplifiers 401 to 403 generate spontaneous emissions. The generated spontaneous emissions are inputted into the demultiplexing ports $R1_1$ to $R1_{N-1}$ of the first wavelength router 100, wavelength-division-multiplexed, outputted to the demultiplexing ports $L1_1$ of the first wavelength router 100, provided with a band selection through the OBPF1 510, and then inputted into the multiplexing ports $R2_1$ of the second wavelength router 200 again. The spontaneous emissions are lased by repeating this process, so that they are used as optical sources in the wavelength division multiplexing optical communication system. When these optical sources having N−1 in number are represented as $\lambda_1, \lambda_2, \lambda_3, \ldots, \lambda_{N-1}$, another N−1 optical sources, represented as $\lambda_1', \lambda_2', \lambda_3', \ldots, \lambda_{N-1}'$, can be obtained by interconnecting the other ports of the first and second wavelength routers.

Additionally, pumping lights generated from the second pumping light generator 620 are inputted into the multiplexing port $L2_N$ of the second wavelength router 200, spectrum-split into N−1 in number, wavelength-division-demultiplexed, and then outputted to the demultiplexing ports $R2_2$ to $R2_N$ of the second wavelength router 200. The wavelength-division-demultiplexed pumping lights are inputted through optical fibers 304 to 306 into the optical fiber amplifiers 404 to 406 and thus the optical fiber amplifiers 404 to 406 generate spontaneous emissions. The generated spontaneous emissions are inputted into the demultiplexing ports $L1_2$ to $L1_N$ of the first wavelength router 100, wavelength-division-multiplexed, outputted to the multiplexing ports $R1_N$ of the first wavelength router 100, provided with a band selection through the OBPF2 520, and then inputted into the multiplexing ports $L2_N$ of the second wavelength router 200 again. The spontaneous emissions are lased by repeating this process, so that they can be used as optical sources in the wavelength division multiplexing optical communication system.

In the above-mentioned two processes, a band of the optical sources $\lambda_1, \lambda_2, \lambda_3, \ldots, \lambda_{N-1}$ is determined through the first optical band pass filter 510, while a band of the optical sources $\lambda_1', \lambda_2', \lambda_3', \ldots, \lambda_{N-1}'$ is determined through the second optical band pass filter 520. Moreover, when each of the optical band pass filters 510 and 520 has a passband property which allows the passband to be separated by an integer multiple of a free spectral range (FSR), optical sources having a different wavelength are generated so that the number of channels for the optical sources can be increased. The increment of the channel number will be described below with reference to FIGS. 4 and 5.

Further, if the multiplexed N−1 optical sources need to be used at the same time, first and second coupler 710 and 720 are provided at front terminals of the first and second optical band pass filter 510 and 520. As a result, the multiplexed signals can be separated and used.

Figure 3:
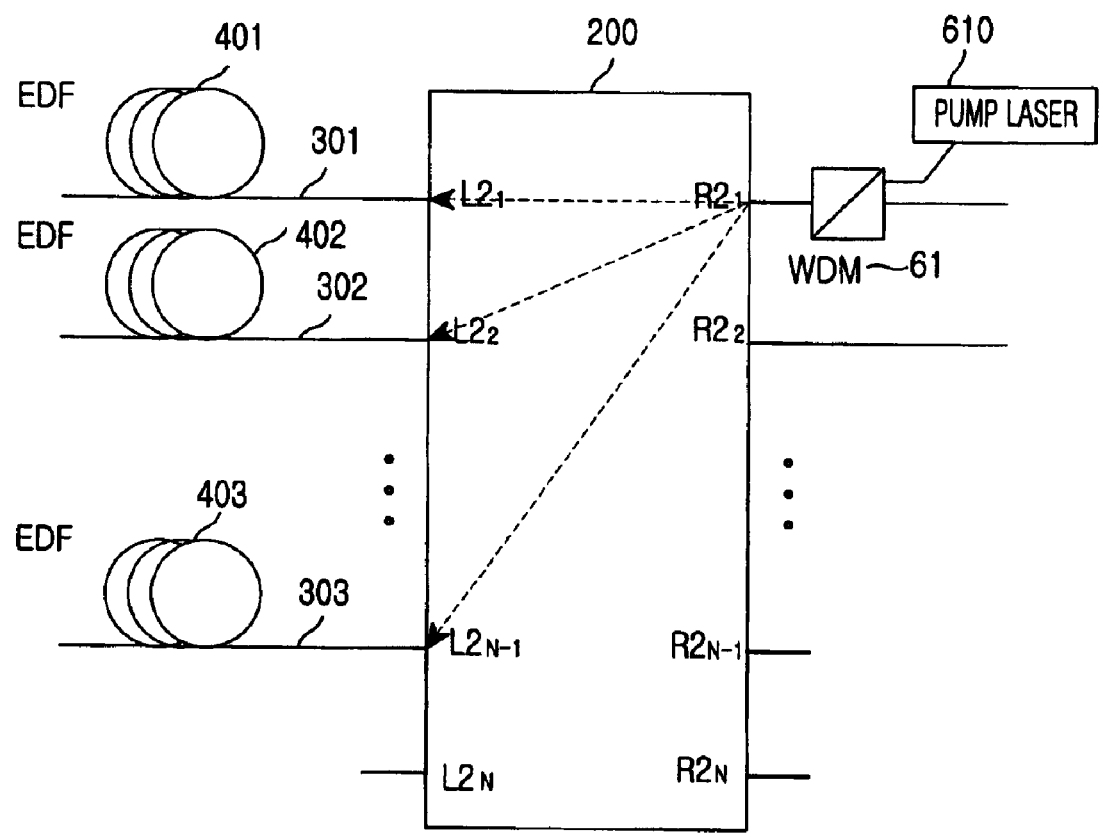
FIG. 3 illustrates how optical amplifiable media employing the optical source generator of the present invention are pumped.

FIG. 3 illustrates how optical amplifiable media employed by the optical source generator of the present invention are pumped. Pumping lights of the pump light generator 610 are within a wavelength band different from that of optical sources used for communication. Therefore, when the pumping lights are transmitted to the multiplexing port $R2_1$ of the wavelength router 200 like an array wave-guide grating using a WDM filter 61 as shown in FIG. 3, the pumping lights are spectrum-split by a periodical property of the wavelength router 200 and outputted through the demultiplexing ports $L2_1, L2_2, L2_3, \ldots, L2_{N-1}$ of the wavelength router 200. The wavelength-division-demultiplexed pumping lights are transmitted through the optical fibers 301 to 303 into the optical fiber amplifiers 401 to 403, and thus the optical fiber amplifier 401 to 403 can function as amplifiers.

Each of the optical fiber amplifiers 401 to 403 is manufactured by doping rare-earth ions such as erbium (Er), praseodymium (Pr), neodymium (Nd) or the like to an active optical fiber. When pumping lights having a particular wavelength are transmitted into this optical fiber, stimulated photons having a particular wavelength are emitted by excitation of the rare-earth ions. As a result, optical signals transmitted through the corresponding optical fiber are amplified.

Figure 4:
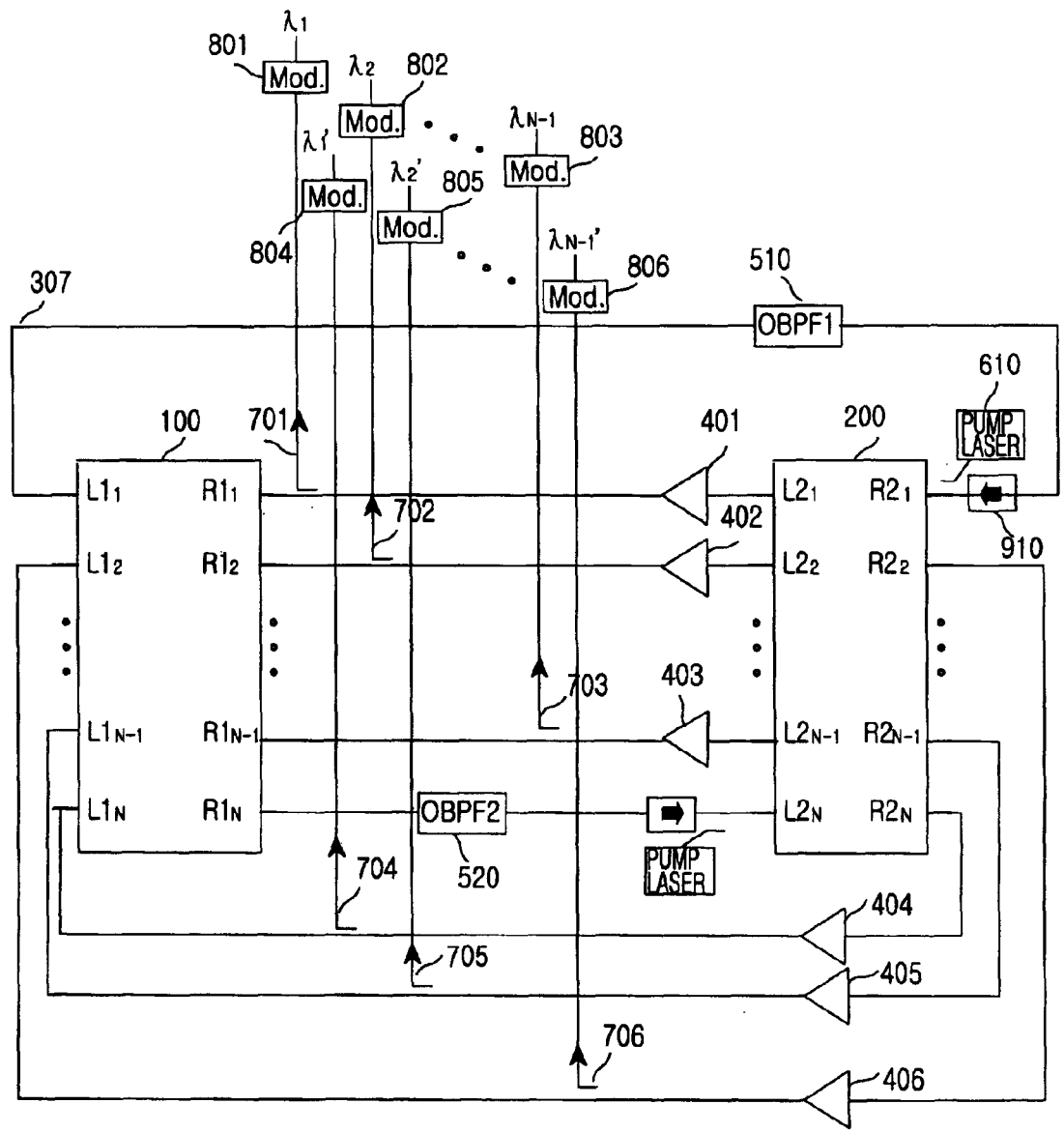
FIG. 4 illustrates an optical source generator for wavelength division multiplexing optical fiber communications system according to a second embodiment of the present invention, in which the optical source generator has 2N–2 optical channels.
Figure 5:
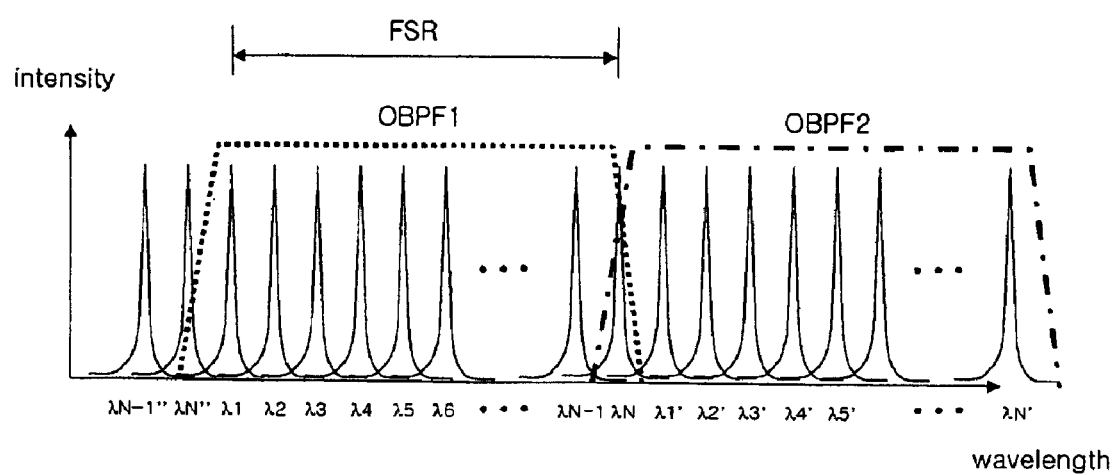
FIG. 5 illustrates a passband property of optical band pass filters that are for increasing the number of optical channels up to 2N–2 as shown in FIG. 4.

FIG. 4 illustrates an optical source generator for wavelength division multiplexing optical communication systems according to a second embodiment of the present invention, in which the optical source generator has 2N−2 optical channels. FIG. 5 illustrates a passband property of optical band pass filters which function to increase the number of optical channels up to 2N−2 as shown in FIG. 4.

An optical source generator for generating 2N−2 optical sources shown in FIG. 4 further includes 2N−2 couplers 701 to 703 and 704 to 706 and 2N−2 modulators 801 to 803 and 804 to 806, as compared to the optical source generator for generating N−1 optical sources shown in FIG. 2, in which the couplers 701 to 703 and the modulators 801 to 803 are provided between the optical fiber amplifiers 401 to 403 and the demultiplexing ports $R1_1$ to $R1_{N-1}$ of the first wavelength router 100, the couplers 704 to 706 and the modulators 804 to 806 are provided between the optical fiber amplifiers 404 to 406 and the demultiplexing ports $L1_2$ to $L1_N$ of the first wavelength router 100. That is to say, the optical source generator shown in FIG. 4 is designed so that the couplers 701 to 703 and 704 to 706 having a predetermined ratio, separate optical sources lased according to each wavelength, and can be used as optical transmitters by being connected with the external modulators 801 to 803 and 804 to 806, respectively. Due to periodical properties of the wavelength routers, signals having a wavelength separated by FSR generate at respective ports of the wavelength routers. Therefore, when bands of the optical band pass filters 510 and 520 are adapted to equal to bands separated by FSR as shown in FIG. 5, the number of the optical sources can be doubled.

Figure 6:
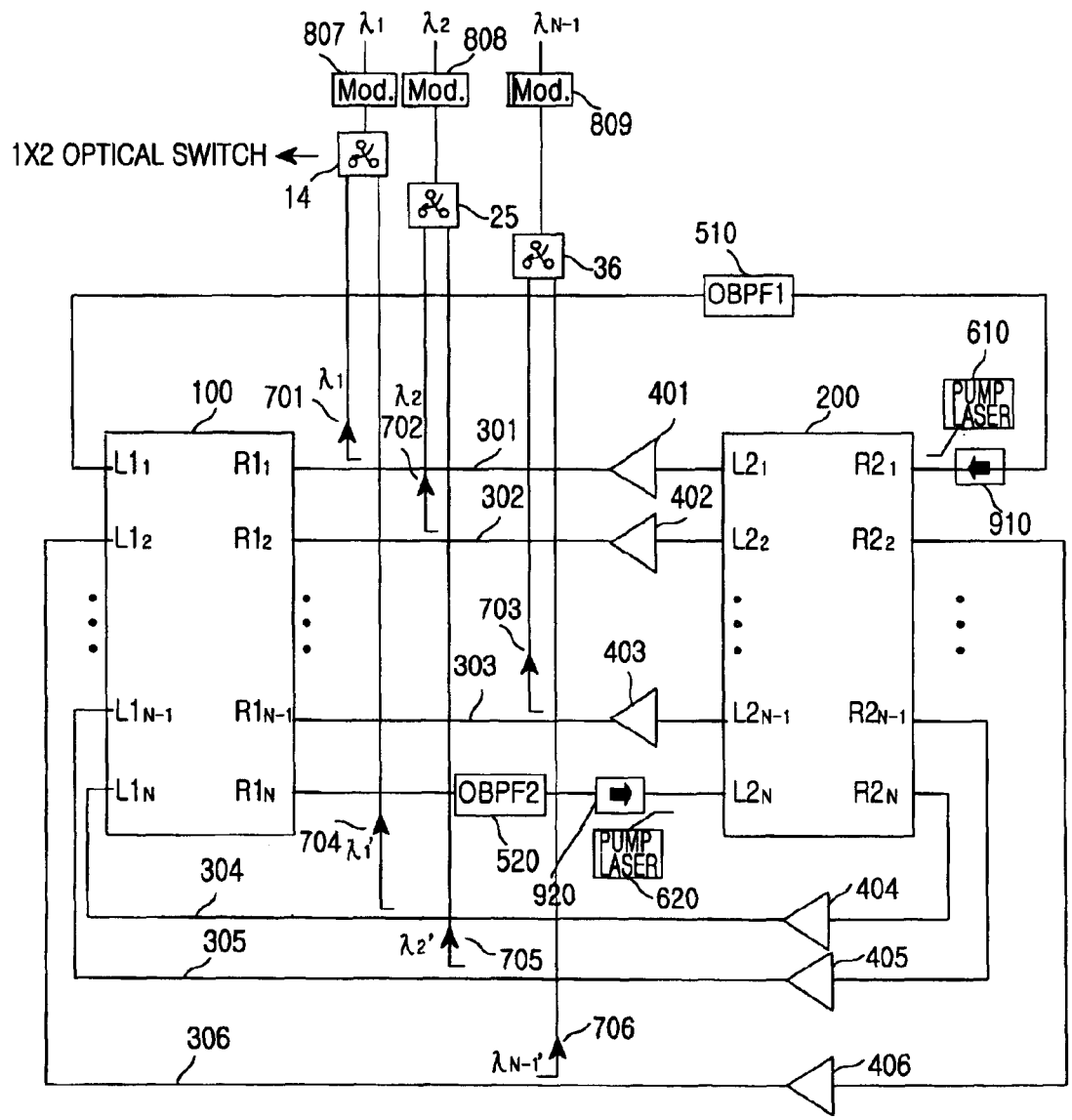
FIG. 6 illustrates an optical source generator for wavelength division multiplexing optical communication systems according to a third embodiment of the present invention, in which the optical source generator functions to protect optical sources when a malfunction of N–1 of the N optical sources occurs.
Figure 7:
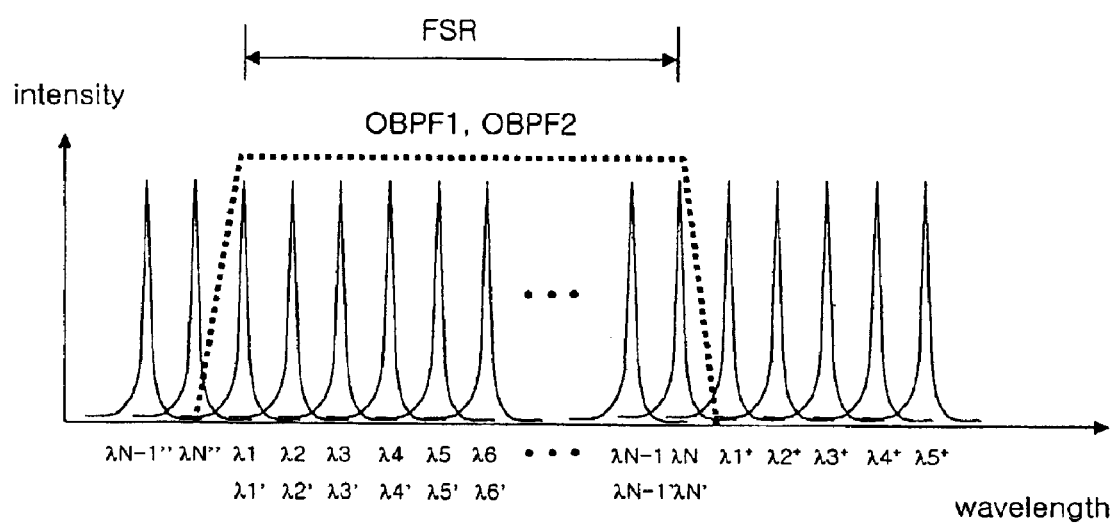
FIG. 7 illustrates a passband property of optical band pass filters for protecting optical sources when a malfunction of N–1 out of N optical sources takes place in the optical source generator shown in FIG. 6.

FIG. 6 illustrates an optical source generator for wavelength division multiplexing optical communication systems according to a third embodiment of the present invention, in which the optical source generator functions to protect optical sources when a malfunction of N−1 of the optical sources takes place. FIG. 7 shows a passband property of optical band pass filters for protecting optical sources when a malfunction of N−1 of the optical sources takes place in the optical source generator illustrated in FIG. 6.

An optical source generator for wavelength division multiplexing optical communication systems illustrated in FIG. 6 is designed to protect optical sources when a malfunction of N−1 optical sources takes place, further comprising 2N−2 couplers 701 to 703 and 704 to 706, N−1 optical switches 1 425 and 36 and N−1 modulators 807 to 809 comparing with the optical source generator for generating N−1 optical sources shown in FIG. 2, wherein the couplers 701 to 703 are provided between the optical fiber amplifiers 401 to 403 and the demultiplexing ports $R1_1$ to $R1_{N-1}$ of the first wavelength router 100, the couplers 704 to 706 are provided between the optical fiber amplifiers 404 to 406 and the demultiplexing ports $L1_2$ to $L1_N$ of the first wavelength router 100, the N−1 optical switches 14, 25 and 36 are provided in interconnection of the couplers 701 to 703 with the couplers 704 to 706, and the N−1 modulators 807 to 809 being provided in connection with the N−1 optical switches 14, 25 and 36. That is to say, the optical source generator shown in FIG. 6 is designed so that the couplers 701 to 703 and 704 to 706 having a predetermined ratio, separate optical sources lased according to each wavelength, and can be used as optical transmitters for protecting optical sources from malfunction by being connected through 1×2 optical switches 14, 25 and 36 with the external modulators 801 to 803. For example, when a malfunction of $\lambda_1'$ optical source of the optical fiber 304 takes place, the $\lambda_1'$ optical source of the optical fiber 304 is replaced with $\lambda_1$ optical source of the optical fiber 301 by a switching operation of the optical switch 14. Therefore, this abnormal optical source can be substituted by a normal optical source. In the case, as shown in FIG. 7, when the first and second optical band pass filters 510 and 520 are designed to have same passband property, optical sources having same wavelength are generated, of which some can be replaced with the others, which are operated abnormally.

While the invention has been shown and described with reference to certain preferred embodiments thereof, it will be understood by one skilled in the art that various modifications may be made therein without departing from the spirit and scope of the invention as defined by the appended claims. Therefore, the present invention should not be limited to the disclosed embodiments.

As seen from the foregoing, the optical source generator for wavelength division multiplexing optical communication systems according to the present invention can effectively increase the number of optical channels as well as make use of some optical sources when the others are operating abnormally. Therefore, in the optical communication system in which a plurality of optical sources are required, it is possible not only to save installation expenses but also to accomplish effective operation.

What is claimed is:

1. An optical source generator for wavelength division multiplexing optical communication systems, comprising:
    a first and a second pumping light generator that generate and output pumping lights having a particular wavelength;
    a first wavelength router that wavelength-division-demultiplexes and outputs the pumping lights output from the first and second pumping light generator;
    a first plurality of optical fiber amplifiers that generate spontaneous emissions from the pumping lights output by a first port section of the first wavelength router, and output the generated spontaneous emissions as optical signals;
    a second plurality of optical fiber amplifiers that generate spontaneous emissions from the pumping lights output by a second port section of the first wavelength router, and output the generated spontaneous emissions as optical signals;
    a second wavelength router that wavelength-division-multiplexes optical signals output by the first and second plurality of optical fiber amplifiers and outputs the wavelength-division-multiplexed optical signals;
    a first optical band pass filter for passing through only optical sources having a particular wavelength band of multi-wavelength optical sources output by the second wavelength router and inputting the passed optical sources into the first wavelength router; and
    a second optical band pass filter for passing through only optical sources having a particular wavelength band of multi-wavelength optical sources output by the second wavelength router and inputting the passed optical sources into the first wavelength router,
    wherein first optical sources are generated through first optical paths which direct in an input direction of the pumping lights inputted from the first pumping light generator, second optical sources being generated through second optical paths which direct in an input direction of the pumping lights inputted from the second pumping light generator.

2. The optical source generator according to claim 1, wherein the first wavelength router comprises the first and the second port section each of which comprises:
    a multiplexing port, wherein the pumping lights output by the first pumping light generator are input into the multiplexing port of the first port section and the pumping lights output by the second pumping light generator are input into the multiplexing port of the second port section, and
    a plurality of demultiplexing ports that wavelength-division-demultiplex the pumping lights output by the first pumping light generator into the multiplexing port of the first port section and output the wavelength-division-demultiplexed pumping lights to the plurality of demultiplexing ports of the second port section, and wavelength-division-demultiplex the pumping lights output by the second pumping light generator into the multiplexing port of the second port section and output the wavelength-division-demultiplexed pumping lights to the plurality of demultiplexing ports of the first port section.

3. The optical source generator according to claim 2, wherein the second wavelength router comprises a third and fourth port section each of which comprises:
    a multiplexing port; and
    a plurality of demultiplexing ports,
    wherein the optical signals output by the first plurality of optical fiber amplifiers are input into the demultiplexing ports of the third port section and the optical signals output by the second plurality of optical fiber amplifiers are input into the demultiplexing ports of the fourth port section, and
    wherein the plurality of demultiplexing ports wavelength-division-multiplex the optical signals output by the first plurality of optical fiber amplifiers into the demultiplexing ports of the third port section and output the wavelength-division-multiplexed optical signals to the multiplexing port of the fourth port section, and wavelength-division-multiplex the optical signals output by the second plurality of optical fiber amplifiers into the demultiplexing ports of the fourth port section and output the wavelength-division-multiplexed optical signals to the multiplexing port of the third port section.

4. The optical source generator according to claim 3, wherein:
the first optical band pass filter passes through optical sources output from the multiplexing port of the second port section of the second wavelength router, and inputs the passed optical sources into the multiplexing port of the first port section of the first wavelength router, and
the second optical band pass filter passes through optical sources output from the multiplexing port of the third port section of the second wavelength router, and inputs the passed optical sources into the multiplexing port of the fourth port section of the first wavelength router.

5. The optical source generator according to claim 2, wherein:
the first optical band pass filter passes through optical sources output from the multiplexing port of the second port section of the second wavelength router, and inputs the passed optical sources into the multiplexing port of the first port section of the first wavelength router, and
the second optical band pass filter passes through optical sources output from the multiplexing port of the third port section of the second wavelength router, and inputs the passed optical sources into the multiplexing port of the fourth port section of the first wavelength router.

6. The optical source generator according to claim 1, wherein the second wavelength router comprises a third and fourth port section each of which comprises:
a multiplexing port; and
a plurality of demultiplexing ports,
wherein the optical signals output by the first plurality of optical fiber amplifiers are input into the demultiplexing ports of the third port section and the optical signals output by the second plurality of optical fiber amplifiers are input into the demultiplexing ports of the fourth port section, and
wherein the plurality of demultiplexing ports wavelength-division-multiplex the optical signals output by the first plurality of optical fiber amplifiers into the demultiplexing ports of the third port section and output the wavelength-division-multiplexed optical signals to the multiplexing port of the fourth port section, and wavelength-division-multiplex the optical signals output by the second plurality of optical fiber amplifiers into the demultiplexing ports of the fourth port section and output the wavelength-division-multiplexed optical signals to the multiplexing port of the third port section.

7. The optical source generator according to claim 6, wherein:
the first optical band pass filter passes through optical sources output from the multiplexing port of the second port section of the second wavelength router, and inputs the passed optical sources into the multiplexing port of the first port section of the first wavelength router, and
the second optical band pass filter passes through optical sources output from the multiplexing port of the third port section of the second wavelength router, and inputs the passed optical sources into the multiplexing port of the fourth port section of the first wavelength router.

8. The optical source generator according to claim 1, wherein the first and second optical band pass filters pass through optical sources having different wavelength ranges so as to increase the number of optical channels of optical sources by causing the first and second optical sources to generate optical sources the wavelength of which are different from each other.

9. An optical source generator according to claim 8, wherein the first and second optical band pass filter has its passbands separated by a certain free spectral range (FSR).

10. An optical source generator according to claim 1, further comprising optical switches for switching the demultiplexing ports of the first optical paths and the demultiplexing ports of the first optical paths in a one-to-one connection so as to replace some of the first optical sources with some of the second optical sources when some of the first optical sources are operating abnormally.

11. An optical source generator according to claim 10, wherein the first and second optical band pass filter passes through optical sources having same wavelength ranges.

12. The optical source generator according to claim 1, wherein:
the first optical band pass filter passes through optical sources output from the multiplexing port of the second port section of the second wavelength router, and inputs the passed optical sources into the multiplexing port of the first port section of the first wavelength router, and
the second optical band pass filter passes through optical sources output from the multiplexing port of the third port section of the second wavelength router, and inputs the passed optical sources into the multiplexing port of the fourth port section of the first wavelength router.

13. An optical source generator for wavelength division multiplexing optical communication systems, comprising:
a first and second pumping light generator for generating and outputting pumping lights having a particular wavelength;
a first wavelength router, comprising a first and second port section each of which comprises a multiplexing port and a plurality of demultiplexing ports, for wavelength-division-demultiplexing the pumping lights inputted from the first pumping light generator into the multiplexing port of the first port section and outputting the wavelength-division-demultiplexed pumping lights to the demultiplexing ports of the second port section, and for wavelength-division-demultiplexing the pumping lights inputted from the second pumping light generator into the multiplexing port of the second port section and outputting the wavelength-division-demultiplexed pumping lights to the demultiplexing ports of the first port section;
a first plurality of optical fiber amplifiers for generating spontaneous emissions from the pumping lights outputted from the demultiplexing ports of the second port section of the first wavelength router, and outputting the generated spontaneous emissions as optical signals;
a second plurality optical fiber amplifiers for generating spontaneous emissions from the pumping lights outputted from the demultiplexing ports of the first port section of the first wavelength router, and outputting the generated spontaneous emissions as optical signals;
a second wavelength router, comprising a third and fourth port section each of which comprises a multiplexing port and a plurality of demultiplexing ports, for wavelength-division-multiplexing optical signals inputted from the first plurality of optical fiber amplifiers into the demultiplexing ports of the third port section and outputting the wavelength-division-multiplexed optical signals to the multiplexing port of the fourth port section, and for wavelength-division-multiplexing optical signals inputted from the second plurality of optical fiber amplifiers into the demultiplexing ports of the fourth port section and outputting the wavelength-division-multiplexed optical signals to the multiplexing port of the third port section;

a first optical band pass filter for passing through only optical sources having a particular wavelength band of multi-wavelength optical sources outputted from the multiplexing port of the second port section of the second wavelength router, and inputting the passed optical sources into the multiplexing port of the first port section of the first wavelength router; and a second optical band pass filter for passing through only optical sources having a particular wavelength band of multi-wavelength optical sources outputted from the multiplexing port of the first port section of the second wavelength router, and inputting the passed optical sources into the multiplexing port of the second port section of the first wavelength router, wherein first optical sources are generated through first optical paths which direct in an input direction of the pumping lights inputted from the first pumping light generator, second optical sources being generated through second optical paths which direct in an input direction of the pumping lights inputted from the second pumping light generator.

14. An optical source generator according to claim 13, wherein the first and second optical band pass filter passes through optical sources having different wavelength ranges so as to increase the number of optical channels of optical sources by causing the first and second optical sources to generate optical sources the wavelength of which are different from each other.

15. An optical source generator according to claim 14, wherein the first and second optical band pass filter has its passband separated by a certain free spectral range (FSR).

16. An optical source generator according to claim 13, further comprising optical switches for switching the demultiplexing ports of the first optical paths and the demultiplexing ports of the first optical paths in a one-to-one connection so as to replace some of the first optical sources with some of the second optical sources when some of the first optical sources are operating abnormally.

17. An optical source generator according to claim 16, wherein the first and second optical band pass filters pass through optical sources having same wavelength ranges.

* * * * *